US009621955B2

(12) United States Patent
Alfishawi et al.

(10) Patent No.: US 9,621,955 B2
(45) Date of Patent: Apr. 11, 2017

(54) IDENTIFYING MEDIA CHANNELS THAT HAVE A HIGH LIKELIHOOD OF MULTIPLE CONSUMPTIONS BY ONE OR MORE USERS

(71) Applicant: GOOGLE INC., Mountain View, CA (US)

(72) Inventors: Thabet Alfishawi, San Francisco, CA (US); Ankur Ramakant Khetan, Mountain View, CA (US); Mark Stevens, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/588,169

(22) Filed: Dec. 31, 2014

(65) Prior Publication Data
US 2016/0192006 A1    Jun. 30, 2016

(51) Int. Cl.
| | |
|---|---|
| H04N 7/10 | (2006.01) |
| H04N 21/466 | (2011.01) |
| H04N 21/435 | (2011.01) |
| H04N 21/81 | (2011.01) |
| G06Q 30/02 | (2012.01) |

(52) U.S. Cl.
CPC ..... *H04N 21/4668* (2013.01); *G06Q 30/0202* (2013.01); *G06Q 30/0282* (2013.01); *H04N 21/435* (2013.01); *H04N 21/812* (2013.01)

(58) Field of Classification Search
CPC . H04N 21/4668; H04N 21/435; H04N 21/812
See application file for complete search history.

(56) References Cited

U.S. PATENT DOCUMENTS

| | | | | |
|---|---|---|---|---|
| 6,163,316 | A  * | 12/2000 | Killian | ............... H04N 5/44543 |
| | | | | 348/553 |
| 2002/0059094 | A1 * | 5/2002 | Hosea | .............. H04N 21/25891 |
| | | | | 725/10 |
| 2004/0001081 | A1 * | 1/2004 | Marsh | ............... G06F 17/30017 |
| | | | | 715/721 |
| 2004/0001500 | A1 * | 1/2004 | Castillo | .................... H04N 5/50 |
| | | | | 370/437 |

(Continued)

OTHER PUBLICATIONS

Protalinski, "YouTube launches Fan Finder initiative, lets channels create video ads to bring in new fans for free", <thenextweb.com/google/2013/11/12/youtube-launches-fan-finder-initiative-lets-channels-create-video-ads-bring-new-fans-free/#gref>, Nov. 12, 2013, 6 pages, The Next Web.

(Continued)

*Primary Examiner* — John Schnurr
*Assistant Examiner* — Cynthia Fogg
(74) *Attorney, Agent, or Firm* — Lowenstein Sandler LLP (57) ABSTRACT

A computer system determines user scores for each channel. The user scores for a respective channel are based on activity of the users accessing one or more media items of the respective channel. The system determines a channel score for the respective channel using the user scores that correspond to the respective channel The channel score indicates a likelihood of the respective channel to have repeated user visits. The system determines a set of the channels relevant to one or more users, and causes a subset of the set of channels to be selected for promotion to the one or more users based on channel scores for the set of channels.

20 Claims, 5 Drawing Sheets

(56) References Cited

U.S. PATENT DOCUMENTS

| | | | | |
|---|---|---|---|---|
| 2004/0216168 | A1* | 10/2004 | Trovato | H04N 7/163 |
| | | | | 725/135 |
| 2007/0263066 | A1* | 11/2007 | Henning | H04N 5/4401 |
| | | | | 348/14.01 |
| 2008/0022307 | A1* | 1/2008 | Jeong | H04N 21/443 |
| | | | | 725/44 |
| 2011/0129201 | A1* | 6/2011 | McLean | H04N 5/782 |
| | | | | 386/296 |
| 2011/0243529 | A1* | 10/2011 | Oryoji | G06F 17/30799 |
| | | | | 386/248 |
| 2011/0321072 | A1* | 12/2011 | Patterson | H04N 21/44222 |
| | | | | 725/5 |
| 2014/0046937 | A1* | 2/2014 | Chennavasin | G06F 17/3053 |
| | | | | 707/723 |
| 2015/0100885 | A1* | 4/2015 | Riley | H04M 1/72519 |
| | | | | 715/720 |

OTHER PUBLICATIONS

Vimeo, "Channels", <vimeo.com/channels, 2016>, 3 pages, made in NYC, NY, US.
Vine Labs, Inc., "Explore a world of beautiful, looping videos", <vine.co/>, 3 pages, 2016.
Wikipedia, "Yahoo! Screen", <en.wikipedia.org/wiki/Yahoo!_Screen>, 3 pages, last modified on Mar. 14, 2016.
The International Searching Authority (European Patent Office), "Search Report and Written Opinion", PCT Application No. PCT/US2015/067104 (Google L0913PCT), 11 pages, mailed on Mar. 21, 2016.

\* cited by examiner

FIG. 5

IDENTIFYING MEDIA CHANNELS THAT HAVE A HIGH LIKELIHOOD OF MULTIPLE CONSUMPTIONS BY ONE OR MORE USERS

TECHNICAL FIELD

The present disclosure relates to media channels and, more particularly, to identifying media channels that have a high likelihood of multiple consumptions by one or more users.

BACKGROUND

On the Internet, content sharing platforms or other applications allow users to upload, view, and share digital content such as media items. Such media items may include audio clips, movie clips, TV clips, and music videos, as well as amateur content, such as video blogging, short original videos, pictures, photos, other multimedia content, etc. Users may use computing devices (such as smart phones, cellular phones, laptop computers, desktop computers, netbooks, tablet computers, gaming consoles, television consoles) to use, play, and/or consume media items (e.g., watch digital videos, and/or listen to digital music).

The content sharing platforms can include one or more channels, which can be viewable over the Internet. A channel is a mechanism for providing certain media items and/or for providing access to media items to users for consumption. Media items for the channel can be selected by a user, uploaded by a user, selected by a content provider, or selected by a broadcaster.

Traditional search systems, recommendation systems, and/or promotion systems evaluate a source of media items (e.g., videos) to generate search results, recommendations of the media items, and/or promotions of the media items generally based on how likely users are to watch the media items in the short term. For example, conventional solutions typically identify standalone viral videos, which are videos that become popular through the process of Internet sharing, usually through video sharing websites, social media and email. The videos may be famous for a spike of time, such as a month or a few weeks. The viral video may be one of multiple videos that are offered by a channel. With such traditional solutions, a user generally watches the viral video multiple times and/or a significant number of users watch the viral video to cause the video to become popular. The users, however, typically do not return to the channel that provides the viral video, and as a result, the other videos that are offered by the channel are usually not consumed.

Other conventional solutions generate search results, recommendations of the media items, and/or promotions of the media items generally based on how likely users are going to subscribe to a channel. Users may subscribe to one or more channels to be able to automatically view media items (e.g., videos) of the channel. For example, Channel-ABCD may have over one million subscribers. The traditional solutions may be successful in recommending and promoting certain channels in order to get users to subscribe to the channels, but generally, the subscribers of the channels do not return back to the channel to consume the media other items that are provided by the channel.

Traditional solutions that identify media items for short-term consumption (e.g., viral videos), and conventional solutions that focus on obtaining subscriptions, generally do not predict the likelihood of users visiting a channel multiple times.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and system to identify media channels, which have a greater likelihood of multiple consumptions by one or more users is described. The method includes determining a plurality of user scores for each channel in a plurality of channels. The user scores correspond to a respective channel. The user scores for a respective channel are based on activity of a plurality of users accessing one or more media items of the respective channel. The method further includes determining a channel score for of the respective channel using the plurality of user scores that corresponds to the respective channel. The channel score indicates a likelihood of the respective channel to have repeated user visits. The method includes determining a set of the plurality of channels relevant to one or more users, and causing a subset of the set of channels to be selected for promotion to the one or more users based on channel scores for the set of the plurality of channels.

In one implementation, the determining of the set of the plurality of channels relevant to one or more users includes determining one or more content types associated with the one or more users, and identifying one or more of the plurality of channels based on the one or more content types associated with the one or more users.

In one implementation, the method further includes filtering the plurality of channels based on one or more filtering parameters prior to selecting the subset of the set of channels for promotion. In one implementation, the filtering parameters include spam filtering parameters, audience ratings parameters, promotion participation parameters, number of media items for a channel, and/or a number of subscriptions for a channel.

In one implementation, the determining of the plurality of user scores that correspond to a respective channel includes identifying a plurality of users accessing one or more media items of the respective channel, determining, based on criteria, one or more of the plurality of users to consider for assigning a user score to the respective channel, and calculating a user score for the respective channel based on activities of the determined one or more users. In one implementation, the criteria includes the respective channel not being accessed by a respective user via promotion content and a minimum number of media items being consumed by the respective user.

In one implementation, the determining of a channel score for the respective channel includes determining that the respective channel satisfies criteria for qualifying a channel to be assigned a channel score. In one implementation, the criteria for qualifying a channel to be assigned a channel score comprises a determination that the channel has a minimum number of user scores.

In one implementation, the determining of the channel score for of the respective channel includes calculating a statistic for the respective channel using the plurality of user scores for the respective channel. In one implementation, the statistic includes a mean or an average.

In one implementation, the selecting of the subset of the set of channels for promotion includes selecting a portion of the set of channels having the greatest channel scores.

An apparatus to identify media channels, which have a greater likelihood of multiple consumptions by a user, for promotion is also described. The apparatus includes means for determining a plurality of user scores for each channel in a plurality of channels. The user scores correspond to a respective channel. The user scores for a respective channel are based on activity of a plurality of users accessing one or more media items of the respective channel. The apparatus further includes means for determining a channel score for of the respective channel using the plurality of user scores that corresponds to the respective channel. The channel score indicates a likelihood of the respective channel to have repeated user visits. The apparatus further includes means for determining a set of the plurality of channels relevant to one or more users, and means for causing a subset of the set of channels to be selected for promotion to the one or more users based on channel scores for the set of the plurality of channels.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

The present disclosure will be understood more fully from the detailed description given below and from the accompanying drawings of various implementations of the disclosure.

DETAILED DESCRIPTION

Implementations of the present disclosure describe identifying media channels, which have a greater likelihood of being consumed (e.g., accessed, visited) by one or more users multiple times, and promoting the identified channels. A channel can be data content available from a common source or data content having a common subject or theme. For example, a channel can be a collection of videos viewable via a graphical user interface (GUI). The content (e.g., videos) of the channel can be accessed by users. A channel is also hereinafter referred to as a "content channel" and/or "media channel." A channel can have an owner that uploads particular media items (e.g., videos) for the channel. A channel owner can be an entity. An entity can include, and is not limited to, a user, a group of users, a business organization such as a corporation, an educational institution such as a college and university, etc. For example, an entity may be a user with an online identity named "ABCGamer" and may have a channel with data content that is accessed through the Internet and/or applications (e.g., mobile applications, desktop applications, gaming applications, television applications, etc.). The channel for ABCGamer may include multiple videos, such as a video of playing a ABC videogame in survival mode, battling other players in the videogame, building structures in the videogame, etc.

Examples of a media item can include, and are not limited to, digital video, digital movies, digital photos, digital music, website content (e.g., web pages), social media updates, electronic books (ebooks), electronic magazines, digital newspapers, digital audio books, electronic journals, web blogs, real simple syndication (RSS) feeds, electronic comic books, software applications, etc. A media item can be a media item consumed via the Internet and/or via an application. For brevity and simplicity, an online video (also hereinafter referred to as a video) is used as an example of a media item throughout this document. As used herein, "media," media item," "online media item," "digital media," and a "digital media item" can include an electronic file that can be executed or loaded using software, firmware or hardware configured to present the digital media item to an entity.

Channels can include one or more media items. For example, ABCGamer's channel may include hundreds of videos. One or more users may be interested in videos related to the ABC videogame and may be in interested in being exposed to ABCGamer's channel, for example, via a promotion (e.g., online advertisement) of ABCGamer's channel. Once exposed to ABCGamer's channel, a user may repeatedly visit ABCGamer's channel to watch the videos offered by the channel. A content sharing platform, which is described in greater detail below in conjunction with FIG. 1, can host thousands of channels that provide various types of content (e.g., gaming videos, children videos, videos of television programming episodes, videos of television programming extra features, etc.). Users may not easily be aware of the various channels (e.g., ABCGamer's channel) that are provided by the content sharing platform and/or the media items (e.g., gaming videos) offered by the channels.

Implementations of the present disclosure can identify which media channels of a content sharing platform have a greater likelihood of particular user(s) accessing the channel multiple times and can promote the identified channels to the particular user(s). A media channel that is identified as having repeated user visits or as having a high probability that one or more users would access the channel multiple times after being first exposed to the channel is hereinafter referred to as a "sticky channel" throughout this document. Implementations of the present disclosure can identify sticky channels and focus the promotion of the sticky channels to particular users to improve the consumption of channels. Implementations of the present disclosure can generate channel scores for the channels to identify which channels in the content sharing platform are sticky channels. Implementations of the present disclosure can personalize the promotion of sticky channels to one or more particular users by identifying sticky channels that are of particular interests to those users. Implementations of the present disclosure can reduce bandwidth and resources by promoting the sticky channels of the channel platform rather than promoting all of the channels in the content sharing platform. In addition, unlike traditional recommendation systems, implementations of the present disclosure identify channels, which at a current point in time may be less popular than other channels, but have a greater likelihood of one or more users accessing the less popular channel multiple times. Implementations of the present disclosure can use a scoring system that accounts for performance of a channel based on the users who have consumed one or more media items of the channel without weighing the score(s) of the channel down with niche content.

Figure 1:
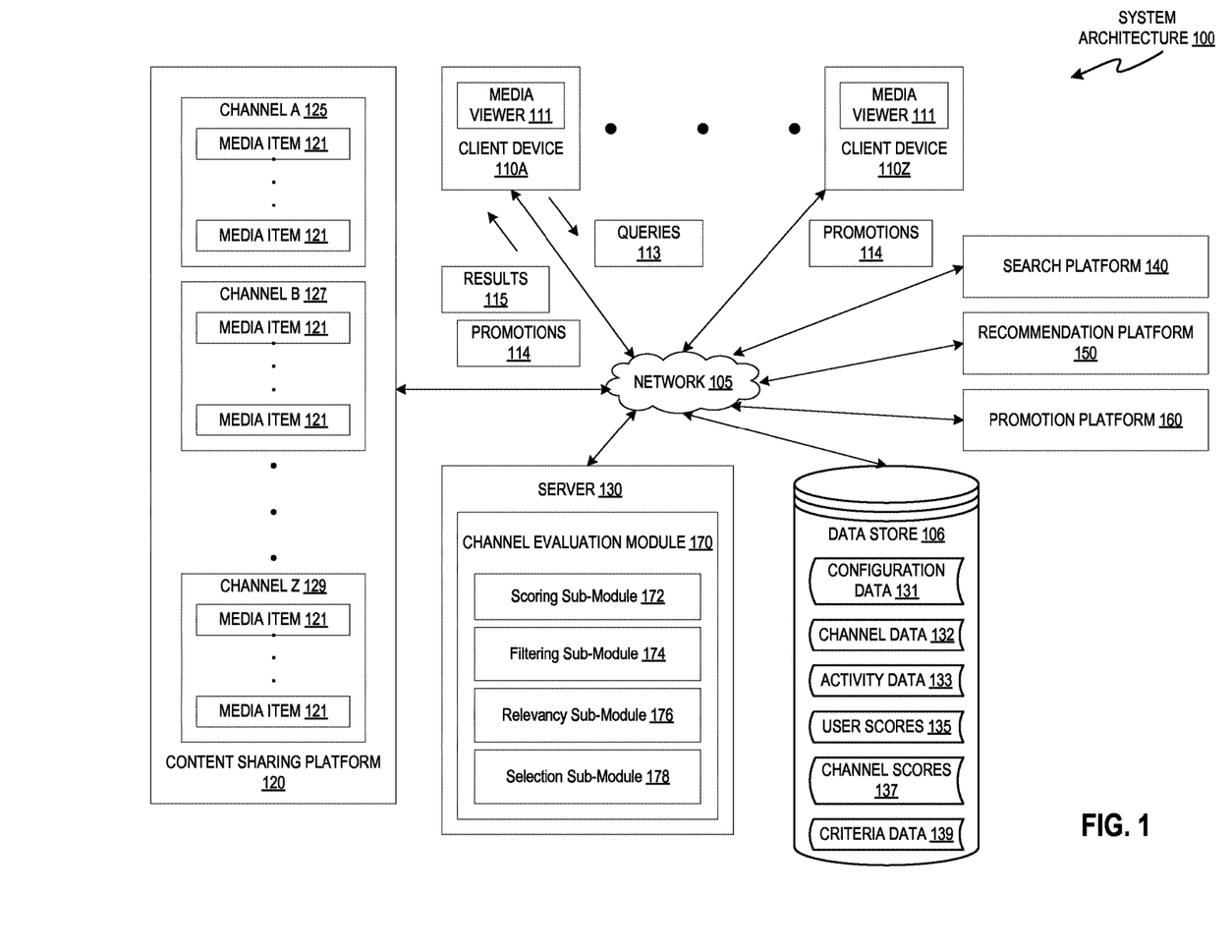
FIG. 1 illustrates example system architecture, in accordance with one or more implementations.

FIG. 1 illustrates example system architecture 100, in accordance with various implementations. The system architecture 100 can include one or more client devices 110A-Z, one or more networks 105, one or more data stores 106, a content sharing platform 120, one or more servers 130, and one or more platforms (e.g., search platform 140, recommendation platform 150, promotion platform 160, etc.).

The content sharing platform 120 includes multiple channels (e.g., Channel A 125 through Channel Z 129). Each channel may include one or more media items 121. In one implementation, the content sharing platform 120 stores the media items 121 using one or more data stores 106. The content sharing platform 120 can include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items 121 and/or provide the media items 121 to the user. For example, the content sharing platform 120 may allow users to consume, upload, search for, approve of ("like"), dislike, edit, recommend, share, rate, and/or comment on media items 121. The content sharing platform 120 can include a website (e.g., one or more webpages) and/or one or more applications that may be used to provide the users with access to the media items 121, for example, via client devices 110A-Z.

The client devices 110A-Z can include devices, such as, cellular telephones, personal digital assistants (PDAs), portable media players, netbooks, laptop computers, electronic book readers, tablet computers, desktop computers, set-top boxes, gaming consoles, televisions, and the like. The individual client devices 110A-Z can include a media viewer 111. In one implementation, the media viewers 111 are applications that allow users to view media items 121, such as images, videos, documents (e.g., web pages), etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 can render, display, and/or present the content (e.g., a web page, a media viewer) to a user. The media viewer 111 may also display an embedded media player (e.g., a Flash® player or an HTML5 player) that is embedded in a document (e.g., a web page). In another example, the media viewers 111 may be standalone applications (e.g., mobile applications, desktop applications, gaming console applications, television applications, etc.) that allow users to view digital media items 121 (e.g., digital videos, digital images, electronic books, etc.).

The media viewers 111 can be provided to the client devices 110A-Z by the server 130 and/or content sharing platform 120. For example, the media viewers 111 may be embedded media players that are embedded in documents (e.g., web pages) provided by the content sharing platform 120. In another example, the media viewers 111 may be applications that are downloaded from the server 130. In another example, the media viewers 111 may be standalone applications that are pre-installed on the client devices 110A-Z.

The server 130 can include a channel evaluation module 170 to evaluate the channels (e.g., Channels A-Z 125-129) of the content sharing platform 120 to determine which channels are likely to have repeated user visits (which channels are sticky channels). Not all of the channels 125-129 of the content sharing platform 120 may be considered sticky channels. The channel evaluation module 170 can filter down, for an individual user and/or a group of users, the channels 125-129, for example, from tens of thousands of channels to a hundred or fewer channels that should be considered as sticky channels and promoted to the individual user and/or group of users.

The channel evaluation module 170 can include a scoring sub-module 172 that can calculate a channel score 137 for individual channels 125-129 and can store the channel scores 137 in the data store 106. The data store 106 can store channel scores 137 for multiple channels 125-129. The scoring sub-module 172 can update the channel scores 137 periodically and can store the updated channel scores 137 for the channels 125-129 in the data store 106.

The channel score 137 for an individual channel (e.g., Channel A 125) can be based on the activity (e.g., channel visits) of users that access one or more media items 121 (e.g., videos) of the respective channel. In some implementations, the channel score 137 of a channel is based on user scores 135 pertaining to that channel. A user score 135 pertaining to an individual channel (e.g., Channel A 125) can be assigned based on activity of a specific user with respect to that channel. The scoring sub-module 172 can access activity data 133 that is stored in one or more data stores 106 to calculate the user scores 135 for a channel (e.g., Channel A 125), and can use the user scores 135 of the channel (e.g., Channel A 125) to create a channel score 137 for the respective channel.

The scoring sub-module 172 can calculate a particular user score 135 pertaining to a particular channel and based on the activity of an individual user accessing the particular channel (e.g., Channel A 125). The scoring sub-module 172 can store the user scores 135 in the data store 106. The data store 106 can store user scores 135 for multiple channels 125-129. The scoring sub-module 172 can update the user scores 135 periodically and can store the updated user scores 135 for the channels 125-129 in the data store 106.

The scoring sub-module 172 may not determine a user score 135 based on activities of all users with respect to a particular channel (e.g., Channel A 125). The scoring sub-module 172 can user criteria data 139 that is stored in the data store 106 to determine which users should be considered when assigning user scores 135 for a particular channel. For example, the criteria data 139 may specify that a user score 135 associated with a user can be calculated for a particular channel (e.g., Channel A 125) if the user did not access the channel (e.g., Channel A 125) as a result of a promotion 114 for the respective channel. In another example, the criteria data 139 further specify that a user score 135 associated with a user can be calculated for a particular channel if the user has consumed a minimum number of media items 121 in the content sharing platform 120.

The scoring sub-module 172 can access activity data 133 to determine user scores 135 for individual channels 125-129. The scoring sub-module 172 can calculate a user score 135 for a particular channel as a function of the number of unique consumption sessions a specific user has had on media items 121 of a respective channel based on the activity data 133 of the user. The scoring sub-module 172 can determine one or more user scores 135 for a particular channel. One implementation of calculating a user score is described in greater detail below in conjunction with FIG. 4.

Referring back to FIG. 1, the activity data 133 can be collected by the content sharing platform 120 and/or channel evaluation module 170. The channel evaluation module 170 may communicate with one or more of the content sharing platform 120 and the platforms (e.g., search platform 140, recommendation platform 150, promotion platform 160), and may collect account information, personal information, and/or demographic information pertaining to individual users and/or groups of users (e.g., age of user groups, geography (e.g., country, state, city) of user groups) and may store the information as activity data 133 in one or more data stores (e.g., hard disks, memories, databases, etc.). In situations in which the implementations discussed herein collect personal information and/or demographic about users, or may make use of personal information and/or demographic information, the user may be provided with an opportunity to control whether the channel evaluation module 170 is allowed to collect the information (e.g., activity data 133 including information about a user's social network, social actions or activities, profession, a user's preferences, or a user's current location), or to control whether and/or how to receive content from the content sharing platform 120 that may be more relevant to the user. In addition, certain data may be treated in one or more ways before it is stored or used, so that personally identifiable information is removed. Thus, the user(s) may have control over how, when, and what type of information (e.g., activity data 133) is collected about the user(s) and used by the channel evaluation module 170.

The scoring sub-module 172 can calculate a channel score 137 for an individual channel (e.g., Channel A 125) using the user scores 135 for the individual channel. Not all of the channels 125-129 may be assigned a channel score 137. The scoring sub-module 172 can assign the channel score 137 to the respective channel (e.g., Channel A 125) if the channel (e.g., Channel A 125) meets criteria. The criteria can be part of the criteria data 139 that is stored in the data store 106. For example, the criteria data 139 may specify that the calculated channel score 137 should be assigned to the respective channel (e.g., Channel A 125) if the respective channel has a minimum number of user scores 135. The criteria data 139 can be configurable and/or user (e.g., system administrator) defined.

The scoring sub-module 172 can adjust the channel score 137 for an individual channel (e.g., Channel A 125) based on configuration data 131 that is stored in the data store 106. For example, the scoring sub-module 172 can adjust a channel score 137 based on the type of content that is offered by the respective channel (e.g., Channel A 125). Some types of content may be more attractive to particular users for return visits. For example, gamer users tend to watch the same gaming videos and/or different gaming videos multiple times. Examples of the types of content can include, and are not limited to, music content, content directed towards children, television programming content, and gaming content.

In another example, the scoring sub-module 172 can adjust a channel score 137 based on a time period (e.g., month, year, season, etc.). Some types of content may be more attractive to particular users for return visits during a particular time period. For example, channels (e.g., Channels A-Z 125-129) that offer media items 121 related to television programming, such as videos of television show episodes and/or videos showing extra content related to television shows may be more attractive to users during the fall television premiere season and/or the spring television finale season.

The scoring sub-module 172 can adjust a channel score 137 by applying a weight to the channel score 137 of the respective channel (e.g., Channel A 125) based on the content type of the respective channel and/or a time period. The configuration data 131 can specify which weight(s) to use to adjust the channel scores 137. The scoring sub-module 172 can access channel data 132 for the respective channel (e.g., Channel A 125) that is stored in the data store 106 to determine the type of content that is provided by the channel. The channel data 132 can include information indicating the content type(s) of the channel, number of media items of the channel, number of subscribers of the channel, general audience ratings related to the media items of the channel, etc. The channel data 132 can include information for multiple channels.

The channel evaluation module 170 can include a filtering sub-module 174 to filter out one or more channels 125-129 from being selected as sticky channels (channels likely to have repeated user visits). The configuration data 131 can include one or more filtering parameters that should be used by the filtering sub-module 174. The filtering parameters can include, for example, and not limited to, spam filtering parameters, audience ratings parameters, promotion participation parameters, number of media items for a channel, and/or number of subscriptions for a channel. The filtering of the channels 125-129 is described in greater detail below in conjunction with FIG. 3. The filtering sub-module 174 can use the channel data 132 for the channels 125-129 to determine which of the channels 125-129 to filter out. The channel data 132 can include information indicating whether the owner of a channel has agreed to participate in being promoted if the channel is selected as a sticky channel. For example, the filtering sub-module 174 can filter out any channels 125-129 whose owners have not agreed to being promoted.

The channel evaluation module 170 can include a relevancy sub-module 176 to a identify set of the channels 125-129 that are relevant to one or more users. The relevancy sub-module 176 can use the activity data 133 to determine one or more types of content of particular interest to a particular user and/or to a group of users. The relevancy sub-module 176 can use the channel data 132 to match the content of one or more channels 125-129 to the types of content which a particular user and/or to a group of users is interested in. In one implementation, the relevancy sub-module 176 determines a relevancy score for the individual channels 125-129 for a particular user and/or group of users. The relevancy score represents how relevant the content of a channel (e.g., Channel A 125) is to the interests of the particular user and/or group of users.

The channel evaluation module 170 can include a selection sub-module 178 to select which of the channels 125-129 are to be categorized as sticky channels based on the channel scores 135 of the channels 125-129, the adjustment of the channel scores 135, the filtering of the channels 125-129, and/or the relevancy of the channels 125-129. The configuration data 131 can include selection parameters for selecting which of the channels 125-129 are sticky channels. For example, the selection parameters may specify that a percentage (e.g., 1%) of the channels 125-129 that have the highest channels scores should be selected as sticky channels in view of the adjustment of the channel scores 135, the filtering of the channels 125-129, and/or the relevancy of the channels 125-129. In another example, the selection parameters may specify the selection sub-module 178 to select a number (e.g., 1000) of the channels that have the highest channels scores as sticky channels in view of the adjustment of the channel scores 135, the filtering of the channels 125-129, and/or the relevancy of the channels 125-129. The selection parameters can be configurable and/or user (e.g., system administrator) defined.

The channel score 137 that is assigned to a channel (e.g., Channel A 125) can be provided to one or more systems. A system (e.g., search system in the search platform 140, recommendation system in the recommendation platform 150, promotion system in the promotion platform 160) can use the channel scores 137 that are assigned to channels 125-129, for example, to rank the media items 121 (e.g., videos) of the channels 125-129 and/or the channels 125-129 themselves in system results (e.g., search results, recommendation results), and in promotions 114 to promote the channels 125-129 that are sticky channels to users.

The platforms (e.g., search platform 140, recommendation platform 150, and promotion platform 160) can include one or more computing devices (e.g., servers), data stores, networks, software components, and/or hardware components that may be used to allow users to access media items 121. The platforms can include a content sharing aspect that allows users to consume, upload, search for, approve of ("like"), dislike, edit, recommend, share, rate, and/or comment on media items 121. In one implementation, the content sharing platform 120 is integrated with the platforms. For example, the promotion platform 160 can be integrated with the content sharing platform 120 to provide promotions 114 of one or more channels 125-129 to the client devices 110A-Z. A promotion 114 of a channel (e.g., Channel A 125) can include, for example, one or more video advertisements of the particular channel. Users can select (e.g., click, touch) a promotion 114 via the client devices 110A-Z and be directed to the respective channel.

In another example, the search platform 140 can be integrated with the content sharing platform 120 to allow a user to submit queries 113 via the client devices 110A-Z to search the Internet and/or other networks for media items, including the media items 121 of the Channels A-Z 125-129, related to a particular topic (e.g., gaming tips for a particular video game). The search platform 140 may also include a search engine. The platforms can generate and provide results 115 for the queries 113 to the client devices 110A-Z. In another implementation, the platforms may be separate from the content sharing platform 120.

One or more of the platforms (e.g., search platform 140, recommendation platform 150, promotion platform 160) can generate improved results 115 (e.g., query results, recommendation results) and/or promotions 114 based on the channel scores 137 that are assigned to the channels. For example, Channel-A 125 may have a channel score that is higher than Channel-B 127, and Channel-A 125 and the media items 121 (e.g., videos) of Channel-A 125 may be positioned in query results 115 more favorably than of Channel-B 127 and/or the videos of Channel-B 127.

The server 130 can be one or more computing devices (e.g., a rackmount server, a server computer, etc.). In one implementation, the server 130 is included in one or more of the content sharing platform 120 or the platforms. In another implementation, the server 130 is separate from the content sharing platform 120 and/or platforms, but may communicate (e.g., exchange data) with the content sharing platform 120 and platforms.

The one or more networks 105 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 100 are not directly connected to each other. In one implementation, architecture 100 includes separate networks 105.

The one or more data stores 106 can be memory (e.g., random access memory), cache, drives (e.g., hard drive), flash drives, database systems, or another type of component or device capable of storing data. The one or more data stores 106 can include multiple storage components (e.g., multiple drives or multiple databases) that may also span multiple computing devices (e.g., multiple server computers).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 2:
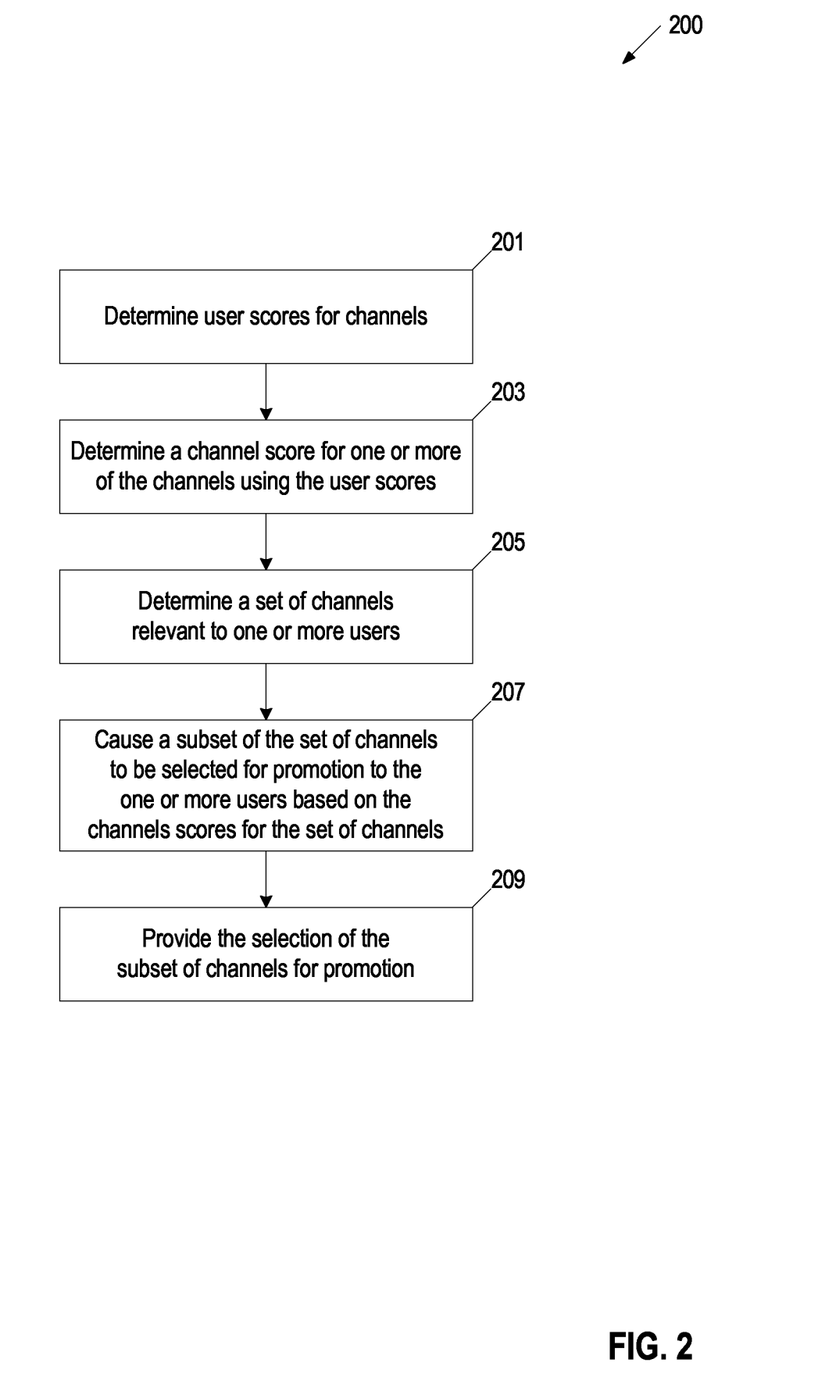
FIG. 2 is flow diagram of an implementation of a method for identifying media channels that have a greater likelihood of being consumed by one or more particular users multiple times, according to one or more aspects of the present disclosure.

FIG. 2 is flow diagram of an implementation of a method 200 for identifying media channels that have a greater likelihood of being consumed (e.g., accessed) by one or more particular users multiple times, according to one or more aspects of the present disclosure. The method 200 may be performed by processing logic that may comprise hardware (circuitry, dedicated logic, etc.), software (such as is run on a general purpose computer system or a dedicated machine), or a combination of both. In one implementation, at least a portion of method 200 is performed by a client computing machine. In another implementation, at least a portion of method 200 is performed by a server computing machine. In one implementation, the method 200 may be performed by the channel evaluation module 170 hosted in a server 130 in FIG. 1.

At block 201, the computing machine determines user scores for channels. In one implementation, the computing machine determines user score(s) for each channel in the content sharing platform. One or more users can access one or more media items (e.g., videos) of a respective channel. Each of the user scores for a channel is based on activity of a respective individual user accessing one or more media items of the respective channel. The computing machine can generate a user score for the respective channel based on criteria pertaining to activity of a specific user with respect to the respective channel. The criteria can include the particular channel not being accessed by the specific user via promotion content and a minimum number of media items consumed by the specific user. The generation of user scores for a channel is described in greater detail below in conjunction with FIG. 4. Referring back to FIG. 2, the computing machine can determine user scores for multiple channels in a content sharing platform and can store the user scores in a data store. The computing machine can periodically update the one or more user scores for the channels and store the updated user scores in the data store. Configuration data can indicate a time period and/or schedule for the updating. The computing machine can store assignment data in the data store that indicates which channels have been assigned user scores and the value of the corresponding user score.

At block 203, the computing machine determines a channel score for a respective channel using the user scores that correspond to the respective channel. The computing machine can determine which channels in a channel platform can be assigned a channel score. In one implementation, the computing machine can identify the channels that satisfy criteria that allow a channel to be assigned a channel score, can calculate a channel score for each of the identified channels that satisfy the criteria, and can assign a channel score to the channels, as described in greater detail below in conjunction with FIG. 3. In another implementation, the computing machine can calculate a channel score for each channel in the content sharing platform, identify the channels that qualify to be assigned a channel score, and then assign a calculated channel score to a respective channel. The computing machine can determine a channel score for multiple channels in a content sharing platform and can store the channel scores in the data store. The computing machine can periodically update the channel scores for the channels and store the updated channel scores in the data store. Configuration data can indicate a time period and/or schedule for the updating. The computing machine can store assignment data in the data store that indicates which channels have been assigned a channel score and the value of the corresponding channel score.

At block 205, the computing machine determines a set of channels relevant to one or more users. The one or more users can be users that are to receive promotion content. The computing machine can determine one or more content types associated with one or more users, for example, from the activity data of the users and/or from users preference data for that users that are stored in a data store, and can identify one or more of the channels that are relevant to the one or more users based on the one or more content types associated with the one or more users. For example, the computing machine may determine from the activity data for a particular user, User-A, that User-A mostly consumes media items that are music media items and/or gaming media items, and may identify one or more channels that provide music media items and/or gaming media items. In one implementation, the computing machine is coupled to a personalization system that identifies one or more channels that are relevant to one or more particular users, and the computing machine receives data from the personalization system that identifies one or more channels that are relevant to one or more particular users.

In one implementation, the computing machine filters the channels based on one or more filtering parameters prior to determining which channels are relevant to one or more particular users, as described in greater detail below in conjunction with FIG. 3.

At block 207, the computing machine causes a subset of the set of channels to be selected for promotion to the one or more users based on channel scores for the set of channels. The computing machine can access configuration data that specifies criteria for selecting the subset of channels. For example, the configuration data may specify the computing machine to select a particular number of channels having the highest channel scores from the channels that are relevant to the one or more users. For example, the computing machine may select the channels having the top 1000 channel scores from the channels that are relevant to the one or more users. In another example, the configuration data may specify the computing machine to select a particular percentage of channels having the highest channel scores from the channels that are relevant to the one or more users. For example, the computing machine may select the channels having channel scores in the top 1% from the channels that are relevant to the one or more users. The value (e.g., number, percentage) can be configurable and/or user-defined. In one implementation, the computing machine selects the subset of channels to be promoted. In another implementation, the computing machine provides the channel scores to another system in the content sharing platform, and the other system selects the subset of channels to be promoted.

At block 209, the computing machine provides the selection of the subset of channels for promotion. The computing machine can provide the selection of the subset of channels, for example, to a promotion system, a recommendation system, and/or a search system.

Figure 3:
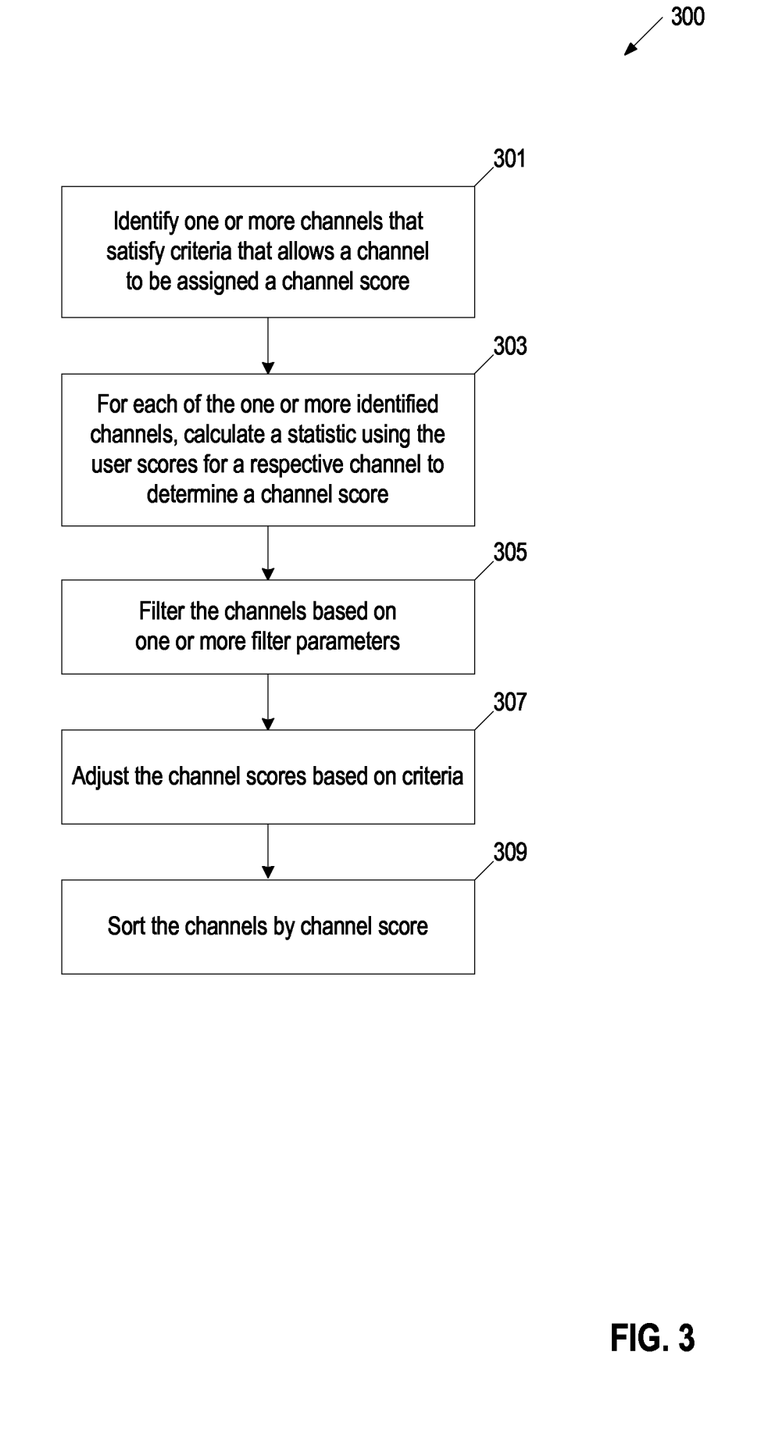
FIG. 3 is flow diagram of an implementation of a method for determining a channel score for individual media channels and identifying the channels that have a greater likelihood of being consumed multiple times by one or more users based on the channel scores, according to various implementations.

FIG. 3 is flow diagram of an implementation of a method 300 for determining a channel score for individual media channels and identifying the channels that have a greater likelihood of being consumed (e.g., accessed, visited) multiple times by one or more users based on the channel scores, according to one or more aspects of the present disclosure. The method 300 may be performed by processing logic that may comprise hardware (circuitry, dedicated logic, etc.), software (such as is run on a general purpose computer system or a dedicated machine), or a combination of both. In one implementation, at least a portion of method 300 is performed by a client computing machine. In another implementation, at least a portion of method 300 is performed by a server computing machine. In one implementation, the method 300 may be performed by the channel evaluation module 170 hosted in a server 130 in FIG. 1.

At block 301, the computing machine identifies one or more channels that satisfy criteria that allow a channel to be assigned a channel score. The computing machine can access criteria data that is stored in a data store. The criteria can include one or more thresholds to improve the integrity of the channel scores. For example, the criteria may include a minimum number of user scores. For example, the criteria may specify that a channel can be assigned a channel score if channel has at least 1000 user scores.

At block 303, for each of the one or more identified channels, the computing machine calculates a statistic for a respective channel using the user scores for the respective channel to determine a channel score for the respective channel. The computing machine can access configuration data that is stored in a data store to determine the statistic that should be calculated. The configuration can specify one or more functions to be used to calculate the statistic. Examples of the function can include, and are not limited to, mean, average, count, maximum, mean, minimum, and sum. For example, the computing machine can calculate the mean of the user scores for the channel as the channel score for the channel.

The channel scores may be any number, text, and/or value. For example, the channel score may be a numerical value from 0 to 1 (e.g., 0.8), where a value of 0 indicates that the channel has a zero probability that user(s) would access the channel multiple times and a value of 1 indicates that the channel has a very high probability that user(s) would return to the channel. In another example, the channel score may be a numerical value from 1 to 10, or 1 to 100, where a higher number indicates that the channel is associated with a higher probability that one or more users would access the channel repeatedly. The format for the channel scores and the definitions (e.g., function(s)) for determining the channel scores can be stored in configuration data (e.g., configuration data 131 in FIG. 1).

At block 305, the computing machine filters the channels based on one or more filter parameters. Even if a channel score is high for a channel, the content of the channel may not necessarily be appropriate for one or more users. For example, the content of a channel may include spam, may be inappropriate for children, etc. The computing machine can apply one or more filters to the channels to filter one or more channels from being selected as sticky channels.

The filtering parameters can include, for example, spam filtering parameters, audience ratings parameters, promotion participation parameters, number of media items for a channel, success rate based on promotions, and/or number of subscriptions for a channel. For example, the computing machine can use spam filtering parameters to filter out one or more channels that provide spam related media items. In another example, the computing machine can filter out one or more channels that do not satisfy a minimum success rate related to promotion of the respective channel. For example, after a channel has been promoted to one or more users, the computing machine can determine a success rate of users visiting the respective channel, and the computing machine can filter out the channel if the channel does not meet the minimum success rate.

Other examples can include filtering out one or more channels that have owners that have not agreed to be promoted, filtering out one or more channels that do not have a minimum number of media items (e.g., videos), filtering out one or more channels that do not have a minimum number of subscribers, and filtering out one or more channels based on audience ratings of the content of the channel. The computing machine can use audience ratings parameters to filter out channels that provide content pertaining to a certain audience rating. The ratings can be based on the Motion Picture Association of America (MPAA) film rating system. For example, some media items may have a MPAA "G" rating for a general audience consumption, some media items may have a MPAA "PG" rating an audience where parental guidance is suggested when consuming the content, some media items may have a MPAA "PG-13" rating for an audience where parents are strongly cautioned about the content, some media items may have a MPAA "R" rating for a restricted audience, some media items may have a MPAA "NC-17" rating for media items exclusively having adult content. For example, when the channel evaluation module is evaluating channels for a particular user, the computing machine may filter out channels that provide content have a certain audience rating (e.g., NC-17) and/or lack of any rating.

The channel data of the channel can be used to filter the channels. Examples of channel data can include, and are not limited to, the number of media items of the channel, the number of subscribers of the channel, the number of video views of the videos of the channel, the number of likes of the channel, a number of recommendations made for the channel, the number of categories associated with the channel, the type of categories associated with the channel, a metric related to the publishing videos for the channel (e.g., the average number of videos that are published per hour for the channel), a channel page rank, and/or an indication of the channel being consumed globally, etc.

The channel data can include metrics of the media items of the channel. Examples of metrics of a media item (e.g., video) can include, and are not limited to, a number of recommendations made of a video, a number of likes of the video, a number of views of the video, a ranking of the video, a metric relating to the release of the video, a number of shares of the video, a number of links to the video, a metric related to consumption time of the video, a format of the video, length (e.g., length) of the video, a consumption locale, etc. In one implementation, the video metrics can include a statistical analysis of an aggregate of the data for the videos of the channel. For example, the video metrics can include, and are not limited to, the average consumption time for the videos of the channel, the average number of likes for the videos of the channel, the average number of times videos of the channel are being recommended, the average amount of time that has elapsed between videos being published to the channel and videos of the channel being consumed, the average number of shares of the videos, the average number of links to the videos, etc.

At block 307, the computing machine adjusts the channel scores based on criteria. For example, the channel scores can be adjusted based on how old a channel score is, the type of content provided by the channel, and the time of year the channel is providing the content. The computing machine can apply one or more weights to individual channel scores to increase or decrease the channel score depending on the criteria. For example, the criteria may specify that if a channel score is older than a threshold value, then the computing machine should apply a weight to the channel score to decrease the value of the channel score. For example, a channel may provide content that is irrelevant today and the computing machine can use the weight to decrease the channel score. For example, a channel may provide content that is related to the summer Olympics, which was 3 years ago, and the original channel score that was calculate three years ago can be adjusted to a lower value to account for the age of the channel score.

In another example, the criteria may specify that if a channel provides television programming related content for a television program that is premiering in the current time of the year, then the computing machine should apply a weight to the channel score to increase the channel score since the content of the channel includes television programming, and should apply another weight to the channel score to further increase the channel score since the content of the channel is related to a television program that is premiering in the current time of the year.

In another example, the criteria may specify that if a channel provides certain type(s) of content, the computing machine should apply a weight to the channel score to decrease a channel score. There are particular types of content that tend to be consumed multiple times. For example, children tend to watch the same children-related videos again and again. In another example, gamer users tend to watch gaming videos frequently and repeatedly. The nature of the type of content that is provided by a channel can cause the channel to have a high value for an initial channel score. The high channel score for such channels may not accurately reflect the larger audience of users that access the content sharing platform because other users may not be interested in children videos or gaming videos. The computing machine can apply a weight to the channel score of channels that provide children videos or gaming videos to decrease the channel scores.

In one implementation, the criteria specify a minimum amount of content of a particular type which a channel should provide before a weight is applied to the channel score of the channel. For example, Channel-A may provide 50 videos, where two of the 50 videos include gaming videos. The criteria may specify that a Channel-A should be classified as providing gaming content if the channel provides 50% gaming content. The computing machine may not apply the weight to Channel-A to decrease the channel score of Channel-A since Channel-A does not provide 50% gaming content.

At block 309, the computing machine sorts the channels by channel score. The computing machine can use the sorted channel scores to identify which of the channels are sticky channels.

Figure 4:
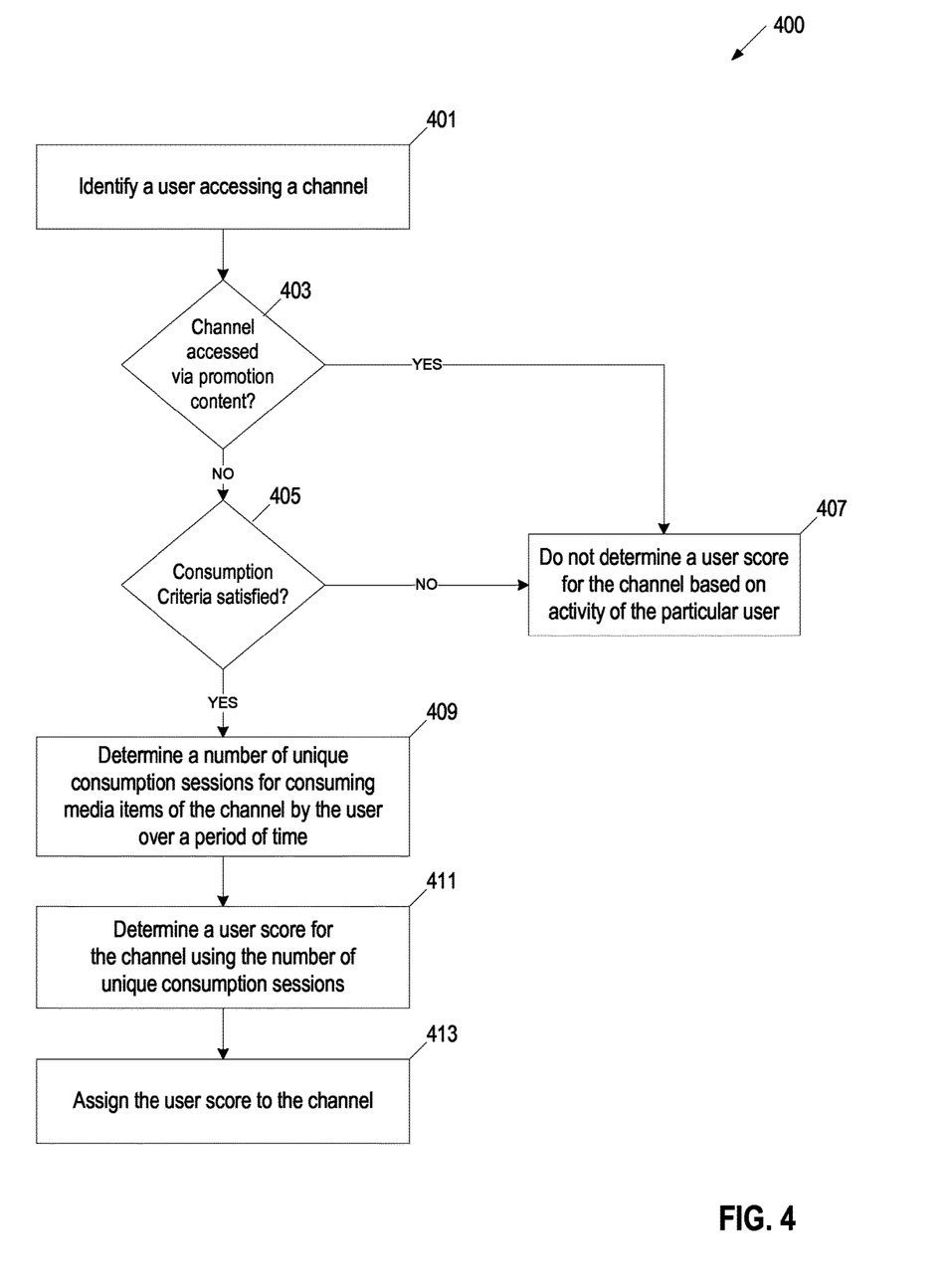
FIG. 4 is flow diagram of an implementation of a method for determining a user score for a channel, according to various implementations.

FIG. 4 is flow diagram of an implementation of a method 400 for determining a user score for a channel, according to one or more aspects of the present disclosure. The method 400 may be performed by processing logic that may comprise hardware (circuitry, dedicated logic, etc.), software (such as is run on a general purpose computer system or a dedicated machine), or a combination of both. In one implementation, at least a portion of method 400 is performed by a client computing machine. In another implementation, at least a portion of method 400 is performed by a server computing machine. In one implementation, the method 400 may be performed by the channel evaluation module 170 hosted in a server 130 in FIG. 1.

At block 401, the computing machine identifies a user accessing a channel. A user identifier can be assigned to a user by the content sharing platform. The user identifier can be an identifier that does not disclose an identity and/or personal information of the user. In addition, certain data may be treated in one or more ways before it is stored or used, so that personally identifiable of the user information is removed.

At block 403, the computing machine determines whether the channel has been accessed by the user via promotion content (e.g., promotion 114 in FIG. 1). For example, a user may have viewed an advertisement for a particular channel, clicked the advertisement, and be directed to the channel as a result of clicking the advertisement. The computing machine can access the activity data of the user, via the user identifier of the user, in a data store. The activity data can indicate whether the user was directed to the channel via promotion content. If the channel has been accessed via promotion content (e.g., channel advertisement), the computing machine does not determine a user score for the channel based on the activity of the particular user at block 407.

If the channel has not been accessed via promotion content (block 403), the computing machine determines whether the consumption criteria is satisfied at block 405. The computing machine can access criteria data, which includes the consumption criteria, that is stored in a data store. In one implementation, the consumption criteria specifies a minimum number of media items of the content sharing platform that should be consumed by the particular user. The minimum number of media item can include media items provided by different channels and media items are not associated with any channel. The computing machine can access activity data in a data store that indicates a number of media items in the content sharing platform that the user has consumed.

In one implementation, the consumption criteria specifies a time period and a minimum number of media items of the content sharing platform that should be consumed by the user within the time period. The activity data can include information indicating when a media item was consumed by a user. If the consumption criteria is not satisfied (block 405), the computing machine does not determine a user score for the channel based on activity of the particular user at block 407.

If the consumption criteria is satisfied (block 405), the computing machine determines a number of unique consumption sessions for consuming media item(s) of the channel by the user over a period of time at block 409. The period of time may be defined in configuration data in the data store. For example, the period of time may be the last 12 months, the last 6 months, or the last 30 days. The period of time can be configurable and/or user (e.g., system administrator) defined. A unique consumption session made by a user of one or more media items of a channel can be defined as the consumption of one or more media items of the channels separated by a threshold minimum duration window. The media items can be the same media item watched multiple times or different media items watched one or more times. The computing machine can disregard media item consumption sessions that are separated by less than the threshold minimum duration window (e.g., 2 days) between the media item consumption sessions. The threshold minimum duration can be configurable and/or user (e.g., system administrator) defined.

For example, User-A may watch a 3-minute Video-X provided by Channel-N repeatedly 5 times within 15 minutes. The computing machine can identify the watching by User-A of Video-X five times within the 15 minutes as one unique consumption session made by User-A for Channel-N. In another example, User-A may watch Video-X one time during Monday and then another time 2 days later. The computing machine can identify the watching by User-A of Video-X on Monday and again on Wednesday as two unique consumption sessions made by User-A for Channel-N.

In another example, User-A may watch a 3-minute Video-X provided by Channel-N, and may watch a different 3-minute video, Video-Y, immediately after watching Video-X. The computing machine can identify the watching by User-A of Video-X and Video-Y immediately after watching Video-X as one unique consumption session made by User-A for Channel-N. In another example, User-A may watch Video-X one time during Monday, watch Video-Y the same time on Tuesday, watch Video-X the same time on Wednesday, watch Video-X the same time on Thursday, and watch Video-Y the same time on Friday. The computing machine can identify the watching by User-A of Video-X on Monday as a unique consumption session, the watching of Video-X the same time on Wednesday as a unique consumption session, and the watching of Video-Y the same time on Friday as a unique consumption session. The computing machine can determine a number of unique consumption sessions for consuming media item(s) of the channel by the user, for example, over the last 12 months.

At block 411, the computing machine determines a user score for the channel using the number of unique consumption sessions made by the particular user for the channel over the time period. The user score can be calculated as a function of the number of unique consumption sessions made by the user for the channel over the time period. In one implementation, the user score is calculated using an exponential scoring function which yields the user score in the range [0,1]. The exponential scoring function can effectively avoid domination by outlier user scores for the channel.

At block 413, the computing machine assigns the user score to the channel. The computing machine can store assignment data in a data store that indicates which channels have been assigned one or more user scores and the value of the respective user scores.

Figure 5:
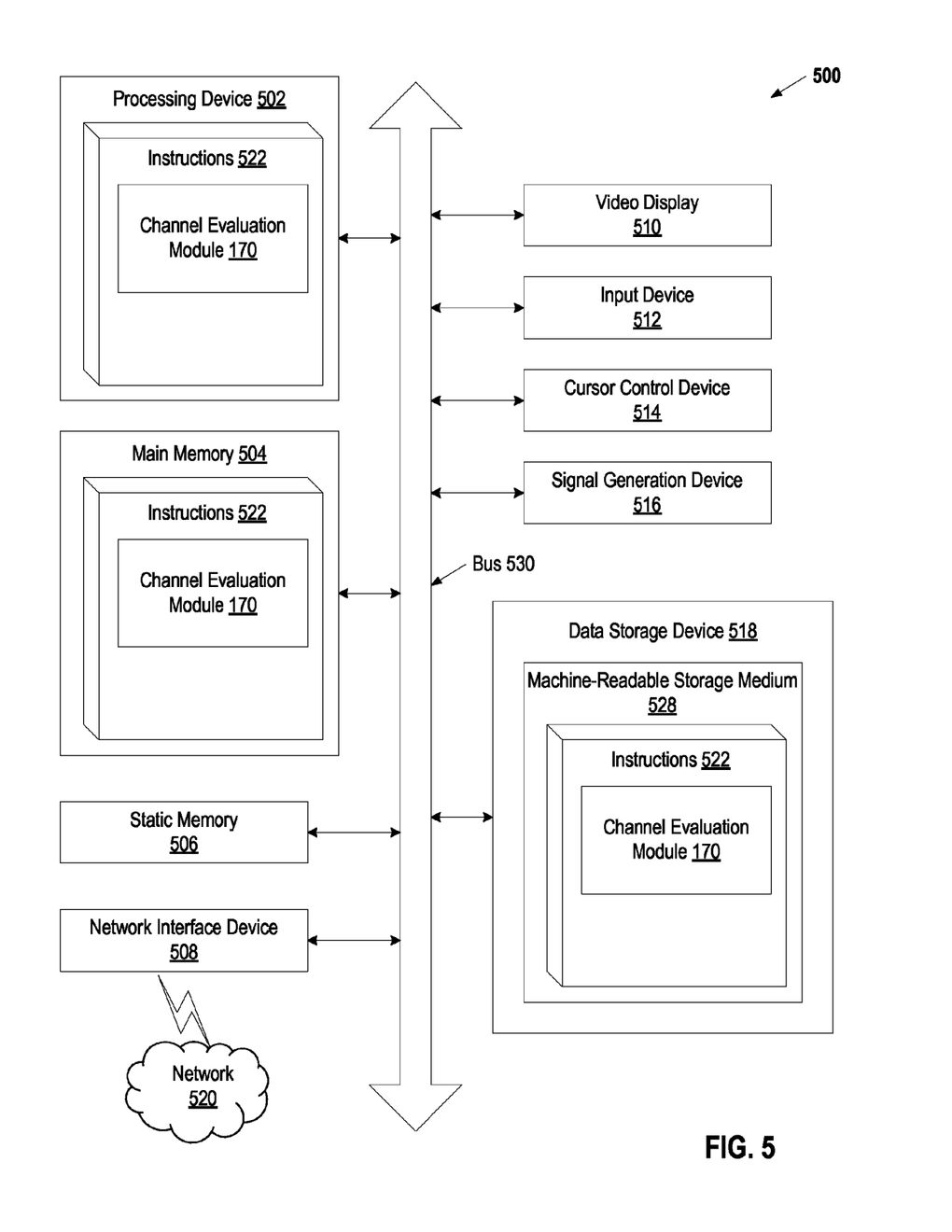
FIG. 5 is a block diagram of an example computer system that may perform one or more of the operations described herein, in accordance with various implementations.

FIG. 5 illustrates a diagram of a machine in an example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an input device 512 (e.g., a keyboard, and alphanumeric keyboard, a motion sensing input device), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one implementation, the instructions 522 include instructions for a channel evaluation module (e.g., channel evaluation module 170 in FIG. 1) and/or a software library containing methods that call the channel evaluation module. While the computer-readable storage medium 528 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "causing", "providing", "identifying", "filtering", "calculating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a processing device, whether access by a plurality of users to a plurality of channels is based on promotion content directing the plurality of users to the plurality of channels;
   for each channel in the plurality of channels, determining a plurality of scores that correspond to a respective channel, wherein the plurality of scores for a respective channel is based on activity of one or more users of the plurality of users accessing one or more media items of the respective channel, and wherein the activity for determining the plurality of scores excludes activity pertaining to accessing the respective channel via the promotion content for the respective channel;
   determining, by the processing device and using the plurality of scores that correspond to the respective channel, a likelihood for the respective channel to be re-visited by the one or more users of the plurality of users;
   determining a set of channels of the plurality of channels of interest to a set of users of the plurality of users; and
   causing respective promotion content of a subset of the set of channels to be provided to the set of users based on determined likelihoods for the set of channels of the plurality of channels to be re-visited by the one or more users of the plurality of users.

2. The method of claim 1, wherein determining the set of channels of the plurality of channels of interest to the set of users comprises:
   identifying the set of channels of the plurality of channels based on content of the set of channels of the plurality of channels.

3. The method of claim 1, further comprising:
   filtering the plurality of channels based on one or more filtering parameters prior to causing the respective promotion content of the subset of the set of channels to be provided to the set of users.

4. The method of claim 3, wherein the filtering parameters comprise at least one of spam filtering parameters, audience ratings parameters, promotion participation parameters, number of media items for a channel, or a number of subscriptions for a channel.

5. The method of claim 1, wherein determining the plurality of scores that correspond to the respective channel comprises:
   determining one or more users of the plurality of users that have not accessed the respective channel via the promotion content for the respective channel;
   determining, based on criterion, one or more of the plurality of users to consider for determining the plurality of scores for the respective channel; and
   calculating the plurality of scores for the respective channel based on activities of the determined one or more users.

6. The method of claim 5, wherein the criterion comprises a minimum number of media items being consumed by the respective user.

7. The method of claim 1, wherein determining the likelihood for the respective channel to be re-visited by the one or more users of the plurality of users comprises:
   determining that the respective channel satisfies one or more criteria for qualifying a channel to be assigned the likelihood.

8. The method of claim 7, wherein the one or more criteria for qualifying a channel to be assigned the likelihood comprises a determination that the channel has a minimum number of scores.

9. The method of claim 1, wherein determining the likelihood for the respective channel to be re-visited by the one or more users of the plurality of users comprises:
   calculating a statistic for the respective channel using the plurality of scores for the respective channel, wherein the statistic comprises at least one of a mean or an average.

10. The method of claim 1, wherein causing the respective promotion content of the subset of the set of channels to be provided comprises:
    selecting a portion of the set of channels having the greatest likelihood to be re-visited by the one or more users of the plurality of users.

11. A system comprising:
    a memory; and
    a processing device coupled with the memory to:
    determine whether access by a plurality of users to a plurality of channels is based on promotion content directing the plurality of users to the plurality of channels;
    determine a plurality of scores that correspond to a respective channel for each channel in the plurality of channels, wherein the plurality of scores for a respective channel is based on activity of one or more users of the plurality of users accessing one or more media items of the respective channel, and wherein the activity to determine the plurality of scores excludes activity pertaining to accessing the respective channel via the promotion content for the respective channel;

determine, using the plurality of scores that correspond to the respective channel, a likelihood for the respective channel to be re-visited by the one or more users of the plurality of users;

determine a set of the plurality of channels of interest to a set of users of the plurality of users; and cause respective promotion content of a subset of the set of channels to be provided to the set of users based on determined likelihoods for the set of the plurality of channels to be re-visited by the one or more users of the plurality of users.

12. The system of claim 11, wherein to determine the set of the plurality of channels of interest to the set of users, the processing device is to:

identify the set of channels of the plurality of channels based on the content of the set of the plurality of channels.

13. The system of claim 11, wherein the processing device is further to:

filter the plurality of channels based on one or more filtering parameters prior to causing the respective promotion content of the subset of the set of channels to be provided to the set of users, wherein the filtering parameters comprise at least one of spam filtering parameters, audience ratings parameters, promotion participation parameters, number of media items for a channel, or a number of subscriptions for a channel.

14. The system of claim 11, wherein to determine the plurality of scores that correspond to the respective channel, the processing device is to:

determine one or more users of the plurality of users that have not accessed the respective channel via the promotion content for the respective channel;

determine, based on criterion, one or more of the plurality of users to consider for determining the plurality of scores for the respective channel, wherein the criterion comprises a minimum number of media items being consumed by the respective user; and calculate the plurality of scores for the respective channel based on activities of the determined one or more users.

15. The system of claim 11, wherein to determine the likelihood for the respective channel to be re-visited by the one or more users of the plurality of users, the processing device is to:

determine that the respective channel satisfies one or more criteria for qualifying a channel to be assigned the likelihood, wherein the one or more criteria comprises a determination that the channel has a minimum number of scores.

16. A non-transitory machine-readable storage medium storing instructions which, when executed, cause a processing device to perform operations comprising:

determining, by the processing device, whether access by a plurality of users to a plurality of channels is based on promotion content directing the plurality of users to the plurality of channels;

for each channel in the plurality of channels, determining a plurality of scores that correspond to a respective channel, wherein the plurality of scores for a respective channel is based on activity of one or more users of the plurality of users accessing one or more media items of the respective channel, and wherein the activity for determining the plurality of scores excludes activity pertaining to accessing the respective channel via the promotion content for the respective channel;

determining, by the processing device and using the plurality of scores that correspond to the respective channel, a likelihood for respective channel to be re-visited by the one or more users of the plurality of users;

determining a set of channels of the plurality of channels of interest to a set of users of the plurality of users; and causing respective promotion of a subset of the set of channels to be provided to the set of users based on determined likelihoods for the set of channels of the plurality of channels to be re-visited by the one or more users of the plurality of users.

17. The non-transitory machine-readable storage medium of claim 16, wherein determining the set of channels of the plurality of channels of interest to set of users comprises:

identifying the set of channels of the plurality of channels based on content of the set of channels of the plurality of channels.

18. The non-transitory machine-readable storage medium of claim 16, the operations further comprising:

filtering the plurality of channels based on one or more filtering parameters prior to causing the respective promotion content of the subset of the set of channels to be provided to the set of users, wherein the filtering parameters comprise at least one of spam filtering parameters, audience ratings parameters, promotion participation parameters, number of media items for a channel, or a number of subscriptions for a channel.

19. The non-transitory machine-readable storage medium of claim 16, wherein determining the plurality of scores that correspond to the respective channel comprises:

determining one or more users of the plurality of users that have not accessed the respective channel via the promotion content for the respective channel;

determining, based on criterion, one or more of the plurality of users to consider for determining the plurality of scores for the respective channel, wherein the criterion comprises a minimum number of media items being consumed by the respective user; and calculating the plurality of scores for the respective channel based on activities of the determined one or more users.

20. The non-transitory machine-readable storage medium of claim 16, wherein determining the likelihood for the respective channel to be re-visited by the one or more users of the plurality of users comprises:

determining that the respective channel satisfies one or more criteria for qualifying a channel to be assigned the likelihood, wherein the one or more criteria comprises a determination that the channel has a minimum number of scores.

* * * * *